US011343357B2

(12) United States Patent
Katta et al.

(10) Patent No.: US 11,343,357 B2
(45) Date of Patent: May 24, 2022

(54) SYSTEMS AND METHODS FOR AUTONOMOUS PROGRAM DETECTION

(71) Applicant: Citrix Systems, Inc., Fort Lauderdale, FL (US)

(72) Inventors: Rama Rao Katta, Fremont, CA (US); Kasirao Velugu, Bengaluru (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 17/102,869

(22) Filed: Nov. 24, 2020

(65) Prior Publication Data
US 2022/0116481 A1    Apr. 14, 2022

(30) Foreign Application Priority Data
Oct. 13, 2020    (IN) .............................. 202021044456

(51) Int. Cl.
*H04L 67/01*    (2022.01)
*H04L 69/329*    (2022.01)
*H04L 67/02*    (2022.01)

(52) U.S. Cl.
CPC .............. *H04L 67/42* (2013.01); *H04L 67/02* (2013.01); *H04L 69/329* (2013.01)

(58) Field of Classification Search
CPC ........ H04L 67/42; H04L 67/02; H04L 69/329
See application file for complete search history.

(56) References Cited

U.S. PATENT DOCUMENTS

| | | | | |
|---|---|---|---|---|
| 7,389,246 | B1* | 6/2008 | Ohrt ....................... | G06Q 40/08 705/4 |
| 8,103,526 | B1* | 1/2012 | Pallesen ................. | G06Q 40/00 705/4 |
| 8,645,198 | B1* | 2/2014 | Nayfeh .............. | G06Q 30/0243 705/14.1 |
| 10,326,789 | B1 | 6/2019 | Vines et al. | |
| 10,659,551 | B1* | 5/2020 | Jakobsson ............... | H04L 67/42 |
| 2014/0047542 | A1 | 2/2014 | Holloway et al. | |
| 2017/0034209 | A1 | 2/2017 | Bhogavilli et al. | |
| 2018/0296928 | A1* | 10/2018 | Vaccari ................. | H04L 51/046 |
| 2019/0190950 | A1* | 6/2019 | Senecal .................. | G06N 20/00 |
| 2021/0281605 | A1* | 9/2021 | Thangellapalli .... | H04L 63/1416 |

OTHER PUBLICATIONS

International Search Report on Written Opinion on PCT Appl. No. PCT/US2021/052406 dated Jan. 4, 2022.

* cited by examiner

*Primary Examiner* — El Hadji M Sall
(74) *Attorney, Agent, or Firm* — Foley & Lardner LLP

(57) ABSTRACT

Systems and methods for autonomous program management include a device which may transmit data to a client in response to a first request from the client. The data may include a response to the first request and a copy of data available to the device corresponding to the first request or the client. The device may receive a second request including the copy of data from the client. The device may determine that the second request is from an autonomous program rather than a user of the client based on the copy of data from the second request. The device may block at least one subsequent request from the client in response to the determination that the second request is from an autonomous program.

20 Claims, 8 Drawing Sheets

SYSTEMS AND METHODS FOR AUTONOMOUS PROGRAM DETECTION

CROSS-REFERENCE TO RELATED APPLICATION

This application claims priority to and the benefit of Indian Provisional Patent Application No. 202021044456, titled "SYSTEMS AND METHODS FOR AUTONOMOUS PROGRAM DETECTION," and filed on Oct. 13, 2020, the contents of all of which are hereby incorporated herein by reference in its entirety for all purposes.

BACKGROUND

In a network environment, a plurality of client devices can be connected to one or more servers to access applications provided by the servers. As a level of traffic to a server increases, the quality of service that the server can provide may decrease. For example, the server can be overloaded or have insufficient resources to handle the traffic. The overload condition can result in service disruptions or failures.

SUMMARY

The present disclosure is directed towards systems and methods for bot (or autonomous program) management. In some aspects, the present disclosure is directed towards a device (and corresponding method) for autonomous program management in distributed systems in real-time.

Bots or autonomous programs (e.g., web robots) are prevalent in today's network traffic. Bots can imitate or replace human user behavior and perform tasks on a faster pace than a human user of a client device. However, the traffic from bots can overwhelm and/or slow down a networks resources resulting in disrupted or delayed service to human users of one or more client devices. The bots can include malicious or attack bots programmed to break into accounts, steal information and/or perform malicious activities. Thus, it is increasingly important to detect and differentiate traffic and/or connections from bots versus a human user.

In some implementations, a device may employ, use, or leverage a client "fingerprinting technique" to determine whether a connection is from an autonomous program or a human being. For example, the device may perform fingerprinting by inserting a script (such as a JavaScript snippet) into a response (e.g., an HTML Response) provided or otherwise served to a client. The script may execute (e.g., automatically) on the client to generate and transmit data corresponding to or otherwise indicative of the client to the device.

The systems and methods described herein may enhance autonomous program detection systems using data (e.g., data from cookies) generated by the device for determining whether the client is in communication with or otherwise associated with an autonomous program or a user (e.g., a human operator).

As one example, the device may leverage a header (e.g., an HTTP REFERRER header, which refers to an address of the previous page from which a link to a currently requested page was followed). For example, the device may check, validate, or otherwise verify the Referrer header in a second request and with an address included or otherwise incorporated into data (e.g., a cookie) sent to the client and generated by the device. As an example, the device may incorporate an address into a cookie which is sent with a response to a first request (for/test_req.html). When the client sends a second request (responsive to execution of the script), the device may determine that the client is associated with or otherwise operated by a user responsive to the Referrer header being the same as '/test_req.html'). This additional security measure prevents the bad actors from making one transaction from a client, copy the client parameters and simulate the same client using Bots. Since the script injection happens on random pages, the bots may not be capable of understanding the script and therefore cannot include the Referrer header which matches the address corresponding to the cookie.

As another example, the device may insert a timestamp (e.g., a current timestamp) or other indicator of origination in a cookie at the time of incorporating a script into a response to the request. When the device receives a second request (e.g., from the client), the device may compare the timestamp for the device and the timestamp in the cookie. If the time difference is below a certain configured threshold, the device may determine that the client is associated with or otherwise operated by a user. However, where the time difference exceeds the threshold, the device may determine that the client is associated with an autonomous program, such as a bot. Such embodiments may decrease the likelihood that bad actors make one transaction from a browser, copy the device parameters, and simulate the same using an autonomous program since the timestamps would likely have a time difference which exceeds the threshold.

As yet another example, the script may automatically collect and send client parameters to the device. In some implementations, the order of parameters may be pre-defined and static, which could result in a bad actor recording the order of the parameters from the browser and replay the requests using an autonomous program. According to the embodiments described herein, the device may define the order of the parameters for individual clients at the time of inserting script in a response, and store the order in a cookie or other data. As a result, when the script automatically executes on the client to collect and post the client parameters, the client parameters are in an order which is defined by the device (rather than in a static order). When the device receives the client parameters in a request (e.g., an HTTP POST), the device may check the order of the parameters against the order defined in data of the request (e.g., an order defined in the cookie). Where the order of the parameters is not the same as the order defined in the cookie, the device may determine that the client is associated with an autonomous program, such as a malicious bot. Since most autonomous programs are incapable of parsing a cookie, it is likely that the autonomous programs will not follow the order of the client parameters defined in the cookie.

As still another example, the device may generate data (e.g., a unique token) for the client and embed, incorporate, or otherwise provide the data to the client (e.g., embed the unique token in a cookie which is sent to and set at the client). The script may automatically execute on the client to request a token from the device. The request may include the cookie sent by the device to the client. The device may extract the token from the cookie, and transmit the cookie to the device. When the script executes to automatically generate a subsequent request, the client may transmit the token (and cookie) with the subsequent request. The device may compare the token received with the subsequent request against the token from the cookie. Where the tokens do not match, the device may determine that the client is associated with an autonomous program. Since most autonomous programs do not have the capability to parse a cookie and simulate browser behavior, it is unlikely that the client will be able to receive a token and use the same token in subsequent requests.

The present disclosure may have many improvements over current technology. For example, the systems and methods described herein may improve the functioning of computers and computing systems by decreasing the likelihood of servers being flooded with bogus or otherwise malicious requests from autonomous programs. Since autonomous programs are typically incapable of parsing cookies encrypted by the device, the autonomous programs are unlikely to be capable of simulating a human operator. For instance, an autonomous program may generate many requests at once. Where the device requests an HTTP REFERRER header corresponding to the preceding request, it is unlikely that the autonomous program will have maintained such data. Therefore, it is unlikely that the URL details from the referrer header and cookie will match. As another example, where an autonomous program simply uses cookies from another client (which has already been validated), the autonomous program will likely not be able to satisfy the token or timestamp requirements (since the tokens would likely not match, and the timestamp will have already expired by the time the autonomous program uses cookies from another client). As another example, where an autonomous program attempts to send client parameters, since the autonomous program likely cannot parse the script, the autonomous program will not be capable of sending the proper client parameters in the correct order. Each of these examples increase the likelihood of successful autonomous program detection.

In one aspect, this disclosure is directed to a method. The method may include transmitting, by a device intermediary to a client and a server, data to the client in response to a first request from the client. The data may include a response to the first request and a copy of data available to the device corresponding to the first request or the client. The method may include receiving, by the device, a second request from the client. The second request may include the copy of data. The method may include determining, by the device, that the second request is from an autonomous program rather than a user of the client based on the copy of data from the second request. The method may include blocking, by the device, at least one subsequent request from the client in response to the determination that the second request is from an autonomous program.

In some embodiments, the copy of data includes one of an address corresponding to the first request, a timestamp corresponding to the response, a defined order of data received in the second request, or a token. In some embodiments, determining that the second request is from an autonomous program is based on a comparison of data corresponding to the second request and the copy of data. In some embodiments, the copy of data includes an address corresponding to the first request. The second request may include a packet including a packet header having an address corresponding to a preceding request. Determining that second request is from an autonomous program may be based on a comparison of the address included in the packet header of the second request with the address from the encrypted data.

In some embodiments, the copy of data includes a timestamp corresponding to the response from the device to the client. The method may further include determining a difference between a time corresponding to the second request and the timestamp from the copy of data, and comparing the difference to a predetermined threshold. Determining that the second request is from an autonomous program may be based on the comparison. In some embodiments, the second request includes a plurality of parameters corresponding to the client. The copy of data may include data corresponding to a defined order of the plurality of parameters. Determining whether the second request is from an autonomous program may be based on a comparison of an order of parameters received in the second request to the defined order of the plurality of parameters from the copy of data.

In some embodiments, the copy of data comprises a first token generated for the client. In some embodiments, the method may further include receiving, by the device, from the client, a third request for a token subsequent to the first request and prior to the second request. The third request may include the copy of data. The method may further include extracting, by the device, the first token from the copy of data, and transmitting, by the device, the first token to the client. The second request may include a second token. Determining that the second request is from an autonomous program may be based on a comparison of the second token from the second request and the first token of the copy of data.

In some embodiments, the method further includes generating, by the device, responsive to determining that the second request is from an autonomous program, a cookie having an indicator which indicates that the client is associated with an autonomous program. The method may further include transmitting, by the device to the client, the cookie, to set the cookie on the client. The at least one subsequent request from the client may include the cookie having the indicator. In some embodiments, the method further includes generating, by the device, responsive to determining that the second request is associated with a user of the client, a cookie having an indicator which indicates that the client is associated with user. The method may further include transmitting, by the device to the client, the cookie, to set the cookie on the client. The at least one subsequent request from the client may include the cookie having the indicator.

In another aspect, this disclosure is directed to a system. The system may include a device arranged intermediate a client and a server. The device may be configured to transmit data to the client in response to a first request from the client. The data may include a response to the first request and a copy of data available to the device corresponding to the first request or the client. The device may be configured to receive, from the client, the second request including the copy of data. The device may be configured to determine, based on the copy of data, that the second request is from an autonomous program rather than a user of the client. The device may be configured to block at least one subsequent request from the client in response to the determination that the second request is from an autonomous program.

In some embodiments, the copy of data includes one of an address corresponding to the first request, a timestamp corresponding to the response, a defined order of data received in the second request, or a token. In some embodiments, determining that the second request is from an autonomous program is based on a comparison of data corresponding to the second request and the copy of data. In some embodiments, the copy of data includes an address corresponding to the first request. The second request may include a packet including a packet header having an address corresponding to a preceding request. Determining that second request is from an autonomous program may be based on a comparison of the address included in the packet header of the second request with the address from the encrypted data.

In some embodiments, the copy of data includes a timestamp corresponding to the response from the device to the client. The device may be configured to determine a difference between a time corresponding to the second request and the timestamp from the copy of data, and compare the difference to a predetermined threshold. Determining that the second request is from an autonomous program may be based on the comparison. In some embodiments, the second request includes a plurality of parameters corresponding to the client. The copy of data may include data corresponding to a defined order of the plurality of parameters. Determining whether the second request is from an autonomous program may be based on a comparison of an order of parameters received in the second request to the defined order of the plurality of parameters from the copy of data.

In some embodiments, the copy of data comprises a first token generated for the client. In some embodiments, the device is further configured to receive, from the client, a third request for a token subsequent to the first request and prior to the second request. The third request may include the copy of data. The device may be configured to extract the first token from the copy of data. The device may be configured to transmit the first token to the client. The second request may include a second token. Determining that the second request is from an autonomous program may be based on a comparison of the second token from the second request and the first token of the encrypted data. In some embodiments, the device is further configured to generate, responsive to determining that the second request is from an autonomous program, a cookie having an indicator which indicates that the client is associated with an autonomous program. The device may be configured to transmit, to the client, the cookie, to set the cookie on the client. The at least one subsequent request from the client may include the cookie having the indicator.

In another aspect, this disclosure is directed to a non-transitory computer readable medium storing program instructions. The instructions may cause a device including one or more processors to receive, from a client, a first request for the server. The instructions may cause the device to transmit one or more data packets to the client. The one or more data packets may include a response to the request from the server, a script executable on the client to generate a second request, and data encrypted by the device and configurable to identify an autonomous program. The instructions may cause the device to receive, from the client, the second request including the encrypted data. The instructions may cause the device to determine, based on data of the second request, that the client is associated with a user or an autonomous program. The instructions may cause the device to block, responsive to the determination that the client is associated with an autonomous program, one or more subsequent requests from the client to the server.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

Figure 6:
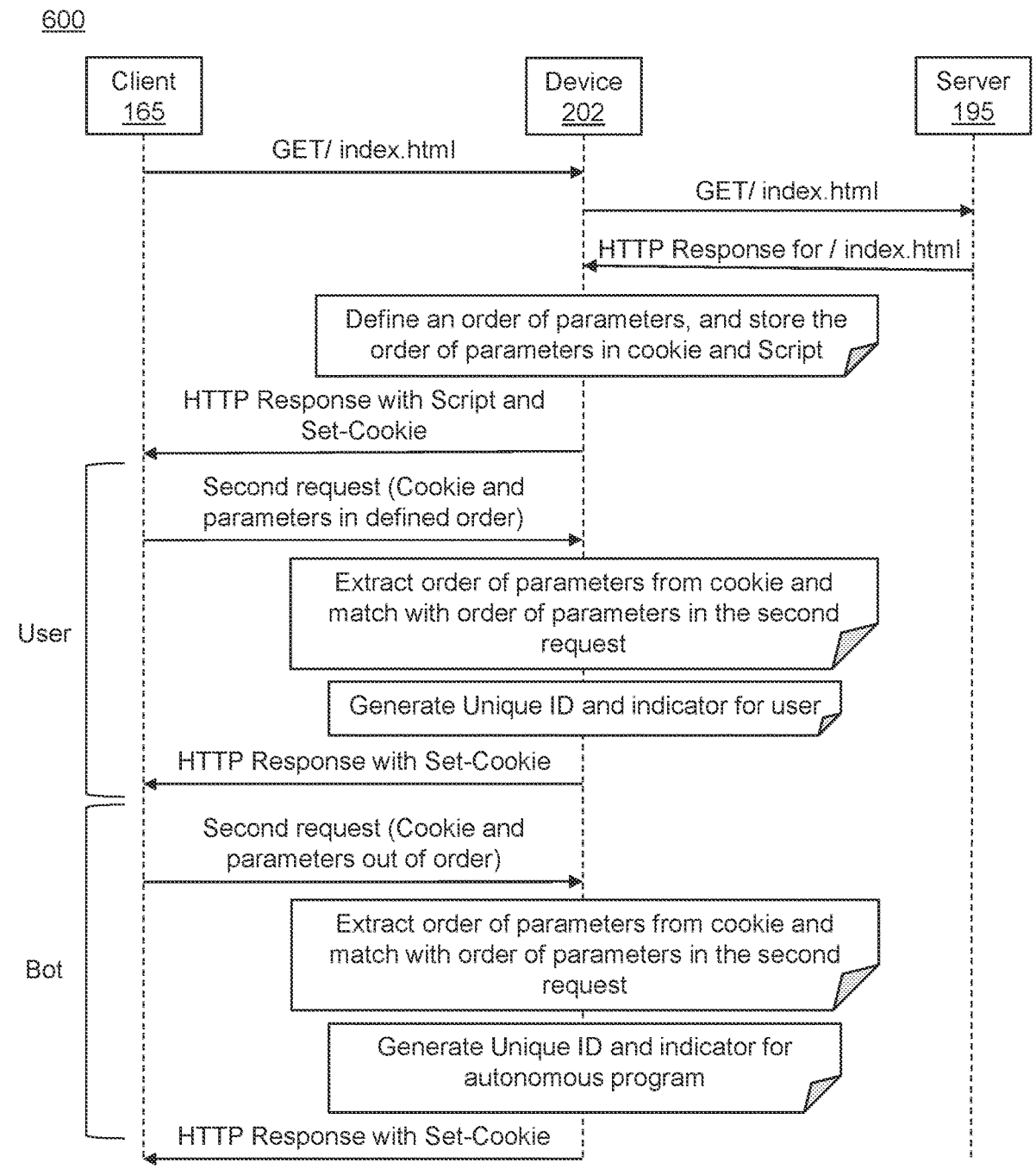
Figure 7:
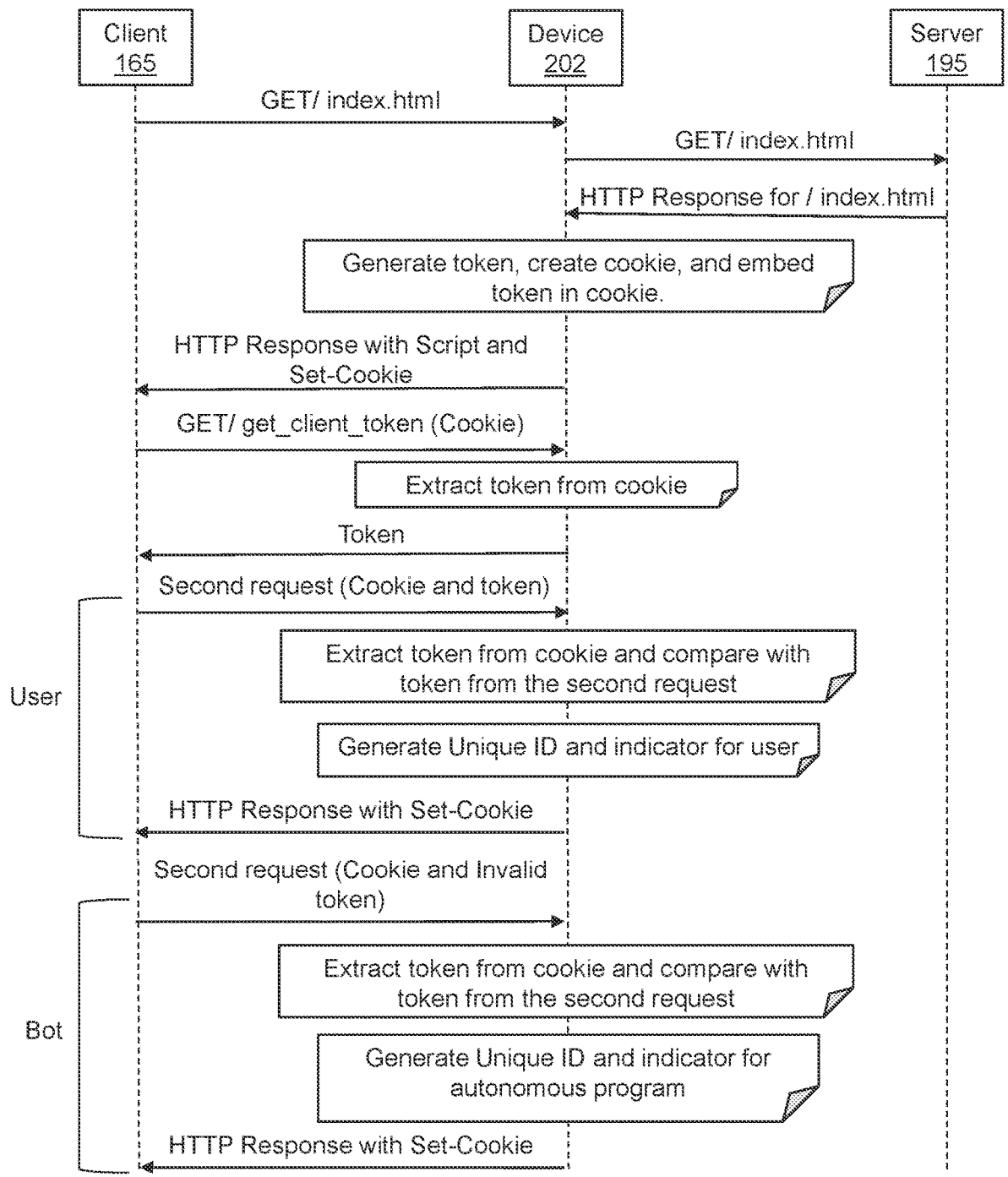

FIG. 6 is a flow diagram depicting is another possible implementation of a method of determining whether a client is associated with a user or an autonomous program, in accordance with an illustrative embodiment; and FIG. 7 is a flow diagram depicting is another possible implementation of a method of determining whether a client is associated with a user or an autonomous program, in accordance with an illustrative embodiment.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein; and Section B describes embodiments of systems and methods for autonomous program management.

A. Network and Computing Environment

Figure 1A:
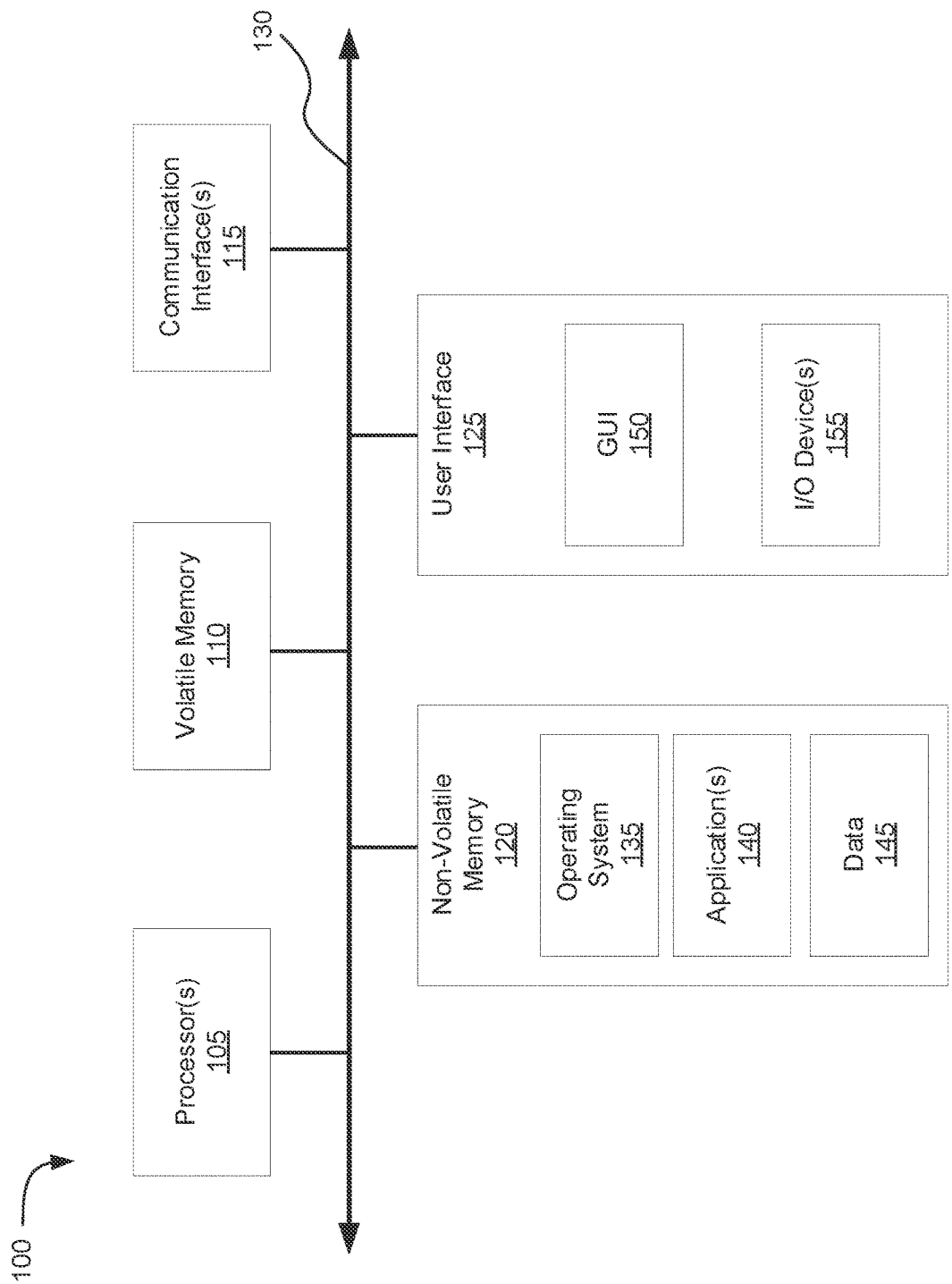
FIG. 1A is a block diagram of embodiments of a computing device.

As shown in FIG. 1A, computer 100 may include one or more processors 105, volatile memory 110 (e.g., random access memory (RAM)), non-volatile memory 120 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 125, one or more communications interfaces 115, and communication bus 130. User interface 125 may include graphical user interface (GUI) 150 (e.g., a touchscreen, a display, etc.) and one or more input/output (I/O) devices 155 (e.g., a mouse, a keyboard, a microphone, one or more speakers, one or more cameras, one or more biometric scanners, one or more environmental sensors, one or more accelerometers, etc.). Non-volatile memory 120 stores operating system 135, one or more applications 140, and data 145 such that, for example, computer instructions of operating system 135 and/or applications 140 are executed by processor(s) 105 out of volatile memory 110. In some embodiments, volatile memory 110 may include one or more types of RAM and/or a cache memory that may offer a faster response time than a main memory. Data may be entered using an input device of GUI 150 or received from I/O device(s) 155. Various elements of computer 100 may communicate via one or more communication buses, shown as communication bus 130.

Computer 100 as shown in FIG. 1A is shown merely as an example, as clients, servers, intermediary and other networking devices and may be implemented by any computing or processing environment and with any type of machine or set of machines that may have suitable hardware and/or software capable of operating as described herein. Processor(s) 105 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 115 may include one or more interfaces to enable computer 100 to access a computer network such as a Local Area Network (LAN), a Wide Area Network (WAN), a Personal Area Network (PAN), or the Internet through a variety of wired and/or wireless or cellular connections.

In described embodiments, the computer 100 may execute an application on behalf of a user of a client computing device. For example, the computer 100 may execute a virtual machine, which provides an execution session within which applications execute on behalf of a user or a client computing device, such as a hosted desktop session. The computer 100 may also execute a terminal services session to provide a hosted desktop environment. The computer 100 may provide access to a computing environment including one or more of: one or more applications, one or more desktop applications, and one or more desktop sessions in which one or more applications may execute.

Figure 1B:
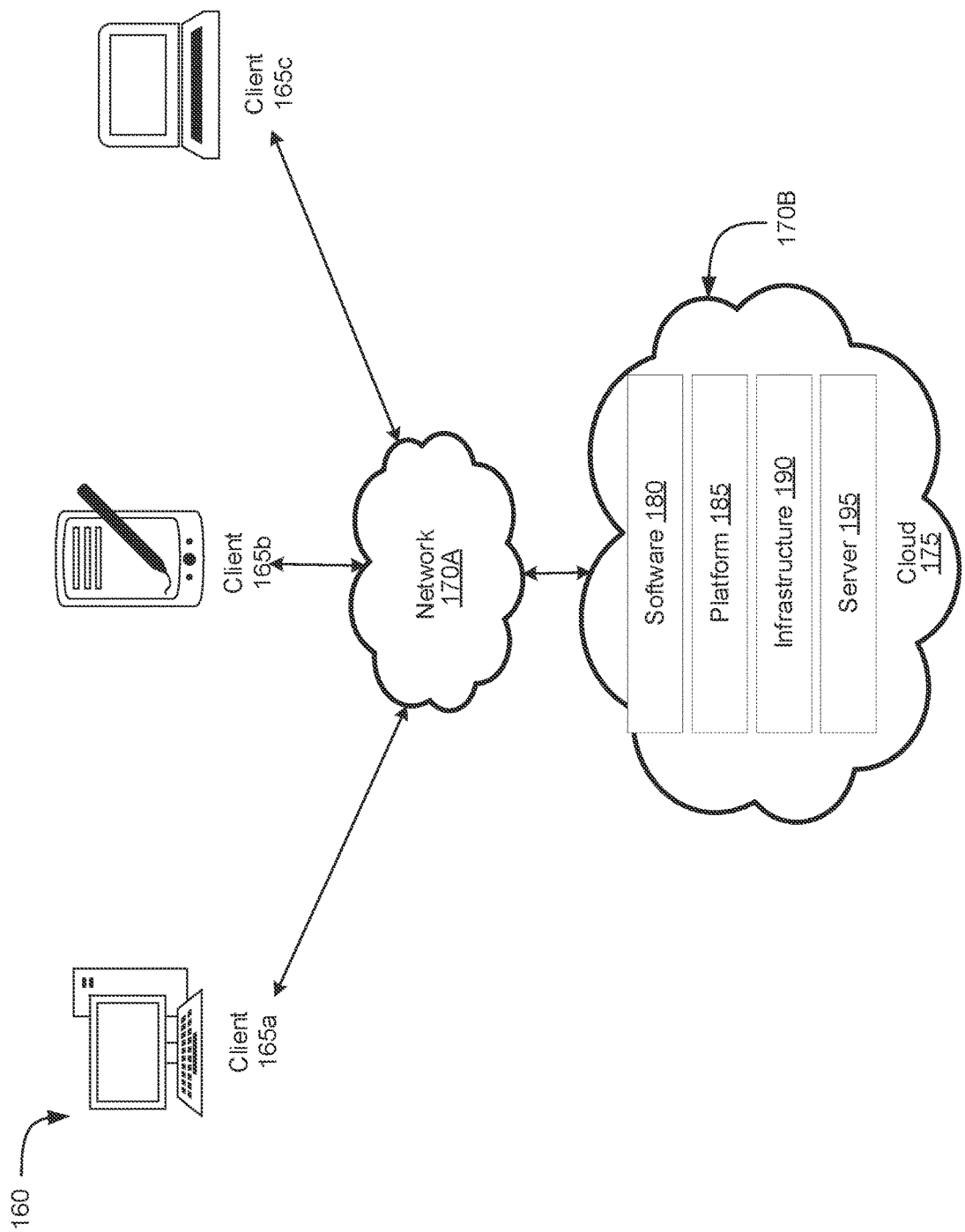
FIG. 1B is a block diagram depicting a computing environment including client device in communication with cloud service providers.

Referring to FIG. 1B, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but not limited to, networks, network bandwidth, servers 195, processing, memory, storage, applications, virtual machines, databases, software, hardware, analytics, and intelligence.

In embodiments, the computing environment 160 may provide client 165 with one or more resources provided by a network environment. The computing environment 160 may include one or more clients 165a-165n, in communication with a cloud 175 over one or more networks 170A, 170B. Clients 165 may include, e.g., thick clients, thin clients, and zero clients. The cloud 175 may include back end platforms, e.g., servers 195, storage, server farms or data centers. The clients 165 can be the same as or substantially similar to computer 100 of FIG. 1A.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In embodiments, the computing environment 160 can include a hybrid cloud that is a combination of a public cloud and a private cloud. For example, the cloud 175 may be public, private, or hybrid. Public clouds 175 may include public servers 195 that are maintained by third parties to the clients 165 or the owners of the clients 165. The servers 195 may be located off-site in remote geographical locations as disclosed above or otherwise. Public clouds 175 may be connected to the servers 195 over a public network 170. Private clouds 175 may include private servers 195 that are physically maintained by clients 165 or owners of clients 165. Private clouds 175 may be connected to the servers 195 over a private network 170. Hybrid clouds 175 may include both the private and public networks 170A, 170B and servers 195.

The cloud 175 may include back end platforms, e.g., servers 195, storage, server farms or data centers. For example, the cloud 175 can include or correspond to a server 195 or system remote from one or more clients 165 to provide third party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 160 can provide on-demand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include server-less computing. The computing environment 160 can include Software as a service (SaaS). For example, the cloud 175 may also include a cloud based delivery, e.g. Software as a Service (SaaS) 180, Platform as a Service (PaaS) 185, and Infrastructure as a Service (IaaS) 190. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 165 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 165 may also access SaaS resources through smartphone or tablet applications, including, e.g., Salesforce Sales Cloud, or Google Drive app. Clients 165 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

B. Systems and Methods for Autonomous Program Detection

The present disclosure is directed towards systems and methods for bot (or autonomous program) detection. In some aspects, the present disclosure is directed towards a device (and corresponding method) for autonomous program detection in distributed systems in real-time.

Bots or autonomous programs (e.g., web robots) are prevalent in today's network traffic. Bots can imitate or replace human user behavior and perform tasks on a faster pace than a human user of a client device. However, the traffic from bots can overwhelm and/or slow down a networks resources resulting in disrupted or delayed service to human users of one or more client devices. The bots can include malicious or attack bots programmed to break into accounts, steal information and/or perform malicious activities. Thus, it is increasingly important to detect and differentiate traffic and/or connections from bots versus a human user.

In some implementations, a device may employ, use, or leverage a client "fingerprinting technique" to determine whether a connection is from an autonomous program or a human being. For example, the device may perform fingerprinting by inserting a script (such as a JavaScript snippet) into a response (e.g., an HTML Response) served or otherwise provided to a client. The script may automatically execute on the client to generate and transmit data corresponding to the client back to the device. However, in some instances, a bad actor may use a client for making one transaction to a server. The client may be "fingerprinted" and be determined to be associated with a human operator. Once the client is fingerprinted following the first transaction, the bad actor may copy the client parameters of the client, and simulate the client using an autonomous program or bot for making additional transactions, thus bypassing the security measure of the fingerprinting technique.

The systems and methods described herein may enhance autonomous program detection systems using data (e.g., cookies) generated by the device for determining whether the client is associated with an autonomous program or a user (e.g., a human operator).

As one example, the device may leverage data from a packet received from the client which indicates an address corresponding to a previous request from the client. For example, the device may receive a packet including a header having an address of a previous page from which a link to a currently requested page was followed (such as, for example, an HTTP REFERRER header). The device may check, validate, or otherwise verify the Referrer header in a second request and with an address included or otherwise incorporated into a cookie sent to the client and generated by the device. As an example, the device may incorporate an address into a cookie which is sent with a response to a first request (for /test_req.html). When the client sends a second request (responsive to execution of the script), the device may determine that the client is associated with a user based on the Referrer header being the same as the address ('/test_req.html') incorporated into the first request. The device may randomly verify a Referrer header from a client with an address incorporated into a cookie to prevent Since the script injection happens on random pages, the autonomous program may not be capable of understanding the script and therefore cannot include the Referrer header which matches the address corresponding to the cookie.

As another example, the device may insert a timestamp or other indication of origination in a cookie at the time of incorporating a script into a response to the request. When the device receives a second request (e.g., from the client), the device may compare the timestamp for the device and the timestamp in the cookie. If the time difference is below certain configured threshold, the device may determine that the client is associated with a user. However, where the time difference exceeds the threshold, the device may determine that the client is associated with an autonomous program. Such embodiments may decrease the likelihood that bad actors make one transaction from Browser, copy the device parameters, and simulate the same using an autonomous program since the timestamps would likely have a time difference which exceeds the threshold.

As yet another example, the script may collect (e.g., automatically collect) and send client parameters to the device. In some implementations, the order of parameters may be pre-defined and static, which could result in a bad actor recording the order of the parameters from the browser and replay the requests using an autonomous program. According to the embodiments described herein, the device may define the order of the parameters for individual clients at the time of inserting script in a response, and store the order in a cookie. As a result, when the script executes on the client to collect and post the client parameters, the client parameters are in an order which is defined by the device (rather than in a static order). When the device receives the client parameters in a response (such as an HTTP POST) along with the cookie, the device may check the order of the parameters against the order defined in the cookie. Where the order of the parameters is not the same as the order defined in the cookie, the device may determine that the client is associated with an autonomous program. Since most autonomous programs are incapable of parsing a cookie, it is likely that the autonomous programs will not follow the order of the client parameters defined in the cookie.

As still another example, the device may generate a token (e.g., a unique token) for the client and embed, incorporate, or otherwise provide the token in a cookie which is sent to and set at the client. The script may execute on the client to request a token from the device. The request may include the cookie sent by the device to the client. The device may extract the token from the cookie, and transmit the cookie to the device. When the script executes to generate a subsequent request, the client may transmit the token (and cookie) with the subsequent request. The device may compare the token received with the subsequent request against the token from the cookie. Where the tokens do not match, the device may determine that the client is associated with an autonomous program. Since most autonomous programs do not have the capability to parse a cookie and simulate browser behavior, it is unlikely that the client will be able to receive a token and use the same token in subsequent requests.

The present disclosure may have many improvements over current technology. For example, the systems and methods described herein may improve the functioning of computers and computing systems by decreasing the likelihood of servers being flooded with bogus requests from autonomous programs. Since autonomous programs are typically incapable of parsing cookies encrypted by the device, the autonomous programs are unlikely to be capable of simulating a human operator. For instance, an autonomous program may generate many requests at once. Where the device requests an HTTP REFERRER header corresponding to the preceding request, it is unlikely that the autonomous program will have maintained such data. Therefore, it is unlikely that the URL details from the referrer header and cookie will match. As another example, where an autonomous program simply uses cookies from another client (which has already been validated), the autonomous program will likely not be able to satisfy the token or timestamp requirements (since the tokens would likely not match, and the timestamp will have already expired by the time the autonomous program uses cookies from another client). As another example, where an autonomous program attempts to send client parameters, since the autonomous program likely cannot parse the script, the autonomous program will not be capable of sending the proper client parameters in the correct order. Each of these examples increase the likelihood of successful autonomous program detection.

Figure 2:
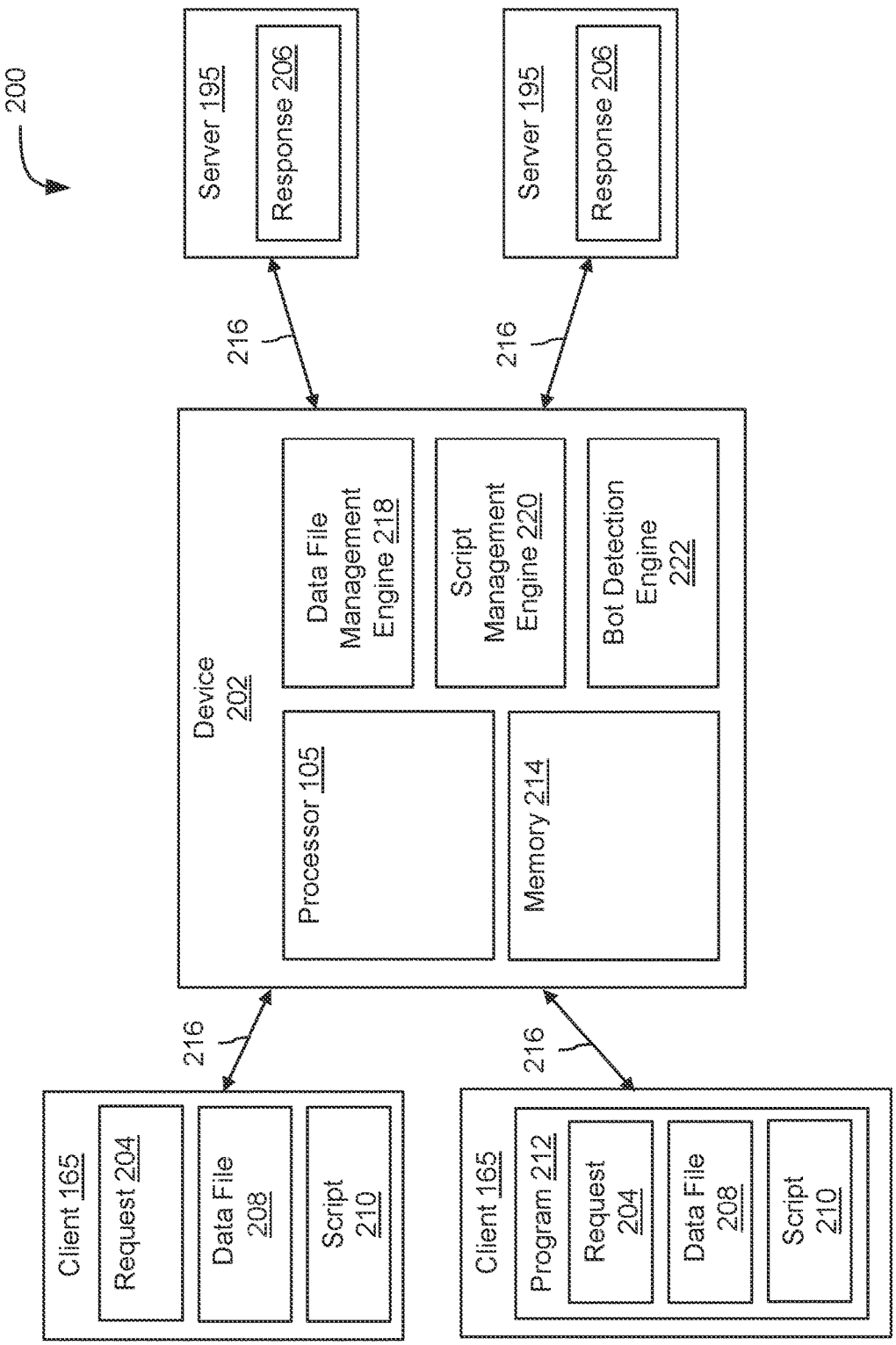
FIG. 2 is a block diagram of a system for autonomous program detection, in accordance with an illustrative embodiment.

Referring now to FIG. 2, depicted is a system 200 for autonomous program detection, according to an illustrative embodiment. The system 200 may include an intermediary device 202, intermediary to a plurality of clients 165 and a plurality of servers 195. The device 202 can handle or process one or more requests 204 from one or more clients 165 to one or more servers 195. The device 202 can handle or process one or more responses 206 from one or more servers 195 to one or more clients 165. The device 202 can transmit a data file 208 and a script 210 to the individual clients 165 with a response to the request 204. The data file 208 may include encrypted data for storage at the client 165. In some embodiments, the data file 208 may be or include a cookie for setting at the client 165, including encrypted data for storage at the client 165 (such as a cookie). The script 210 may cause the client 165 to generate (e.g., automatically generate) a second request to the device 202 which includes the cookie 208 from the device 202. The device 202 may analyze the data corresponding to the second request and the encrypted data from the cookie 208 to determine whether the client 165 is associated with an autonomous program 212.

The device 202 can be implemented using hardware or a combination of software and hardware. For example, individual components of the device 202 can include logical circuitry (e.g., a central processing unit or CPU) that responses to and processes instructions fetched from a memory unit (e.g., memory 214). The components of the device 202 can include or use a microprocessor 105 or a multi-core processor 105. A multi-core processor 105 can include two or more processing units on a single computing component. Components of the device 202 can be based on any of these processors, or any other processor capable of operating as described herein. Processors 105 can utilize instruction level parallelism, thread level parallelism, different levels of cache, etc. For example, the device 202 can include at least one logic device such as a computing device or server having at least one processor 105 to communicate via a network 170. The components and elements of the device 202 can be separate components or a single component. For example, the device 202 can include combinations of hardware and software, such as one or more processors 105 configured to initiate stop commands, initiate motion commands, and transmit or receive event data, for example.

The device 202 can include a memory component (e.g., memory 214) to store and retrieve data. The memory 214 can include a random access memory (RAM) or other dynamic storage device, coupled with the device 202 for storing information, and instructions to be executed by the device 202. The memory 214 can include at least one read only memory (ROM) or other static storage device coupled with the device 202 for storing static information and instructions for the device 202. The memory 214 can include a storage device, such as a solid state device, magnetic disk or optical disk, coupled with the device 202 to persistently store information and instructions.

Clients 165 can include any form of a computing device described herein. The clients 165 can generate a request 204 for at least one server 195 or for an application or resource provided by at least one server 195. The request 204 can identify or indicate the server 195 and/or the application. The request 204 can identify or indicate the client 165 transmitting the request 204. The client 165 can transmit or provide the request 204 to the device 202 through at least one connection 216. For example, the clients 165 can connect with the device 202 and/or one or more servers 195 through one or more connections 216. The client 165 can establish a connection 216 to the device 202 to access or request access to at least one server 195 or an application provided by a server 195.

The connections 216 can include a channel, connection or session between a client 165 and the device 202, between the device 202 and a server 195 and/or between a client 165 and a server 195. In some embodiments, the connections 216 can include encrypted and/or secure connections 216. For example, the connections 216 may include encrypted sessions and/or secure sessions. The encrypted connections 216 can include encrypted files, data and/or traffic transmitted between a client 165 and the device 202, between the device 202 and a server 195 and/or between a client 165 and a server 195.

In some embodiments, a client 165 can include or execute an autonomous program 212. In embodiments, an autonomous program 212 can imitate a client 165 and can initiate a connection or attempt to connect to the device 101. The autonomous program 212 can include or correspond to a bot or web robot configured to behave like a human user of a client 165. For example, the autonomous program 212 can imitate or replace human user behavior and perform tasks, such as but not limited to, interacting with or following a link provided within a response 206 or a web page. In embodiments, the autonomous program 212 provides one or more requests 204 to the device 202. For example, the autonomous program 212 can generate a request 204 for the server 195 and forward the request 204 to the device 202.

Servers 195 can include or deploy as, and/or be executed on any type and form of computing device, such as any desktop computer, laptop computer, or mobile device capable of communication over at least one network and performing the operations described herein. For example, servers 195 can include or correspond to one computer, a plurality of computers, or a network of distributed computers such as computer 100 shown in FIG. 1A. In embodiments, servers 195 can executes one or more applications on behalf of one or more of clients 165 (e.g., as an application server), although other uses are possible, such as a file server, gateway server, proxy server, or other similar server uses. Clients 165 may seek access to hosted applications on servers 106. The applications may include network applications that are served from and/or hosted on one or more servers (e.g., server 195, remote servers, application servers). The applications can include an application hosted on at least one server 195 and accessed by at least one client 165 via a network 170. The applications can include, but not limited to, a web application, a desktop application, remote-hosted application, a virtual application, a software as a service (SaaS) application, a mobile application, an HDX application, a local application, a native application (e.g., native to the client device), and/or a device couple with one or more of the clients 165.

Each of the above-mentioned elements or entities is implemented in hardware, or a combination of hardware and software, in one or more embodiments. Components of the device 202 may be implemented using hardware or a combination of hardware or software detailed above in connection with FIGS. 1A-1B. For instance, these elements or entities can include any application, program, library, script, task, service, process or any type and form of executable instructions executing on hardware of a client device (e.g., device 202). The hardware includes circuitry such as one or more processors 105 in one or more embodiments.

The device 202 may be configured to generate data for determining whether the client 165 is associated with or otherwise operated by a user (as opposed to an autonomous program 212). For example, the device 202 may include a data file management engine 218. The data file management engine 218 may be or include any device, component, software, script, or other combination of hardware and software configured to generate and encrypt data to include in a data file 208 which is sent to the client 165. In some embodiments, the data file 208 may be or include a cookie which is to be set at the client 165. The data file 208 may be or include any data generated by the device 202 which is to be stored (e.g., temporarily for a session or permanently or persistently) at the client 165. The data file management engine 218 may be configured to generate data corresponding to the client 165, request 204, response 206, and/or the device 202. For example, the data may be or include an address corresponding to the request 204 (as described with reference to FIG. 4), a timestamp corresponding to the response 206 (as described with reference to FIG. 5), a defined order of data received from the client 165 in a subsequent request (as described with reference to FIG. 6, or a token generated for the client 165 (as described with reference to FIG. 7). The data file management engine 218 may be configured to encrypt the data for including in a response 206 to the client 165. The data file management engine 218 may be configured to encrypt the data using one or more data encrypted methods, types, or schemes, such as using symmetric keys, public/private keys, etc. for generating an encrypted data file 208. The device 202 may be configured to include, embed, incorporate, or otherwise provide the data file 208 with the response 206. Once the data file 208 is set, stored, or otherwise maintained at the client 165, the client 165 may automatically transmit the data file 208 with any subsequent requests (e.g., during the same session where the data file 208 is temporarily set at the client 165, or indefinitely where the data file 208 is a persistent data file 208). As described in greater detail below, the device 202 may be configured to use the encrypted data and data corresponding to one or more subsequent requests for determining whether the client 165 is associated with a user or an autonomous program 212.

The device 202 may be configured to include, embed, incorporate, or otherwise provide a script 210 with the response 206 generated by the server 195 and sent to the client 165 via the device 202. The device 202 may include a script management engine 220. The script management engine 220 may be or include any device, component, software, script, or other combination of hardware and software configured to generate and manage a script 210 which is executed on the client 165 to generate one or more subsequent requests 204. In other words, the script 210 may be an executable software designed or implemented to automatically generate one or more subsequent requests from the client 165 to the device 202. In some embodiments, the script management engine 220 may be configured to generate JavaScript snippet which is automatically executed on the client 165.

The device 202 may be configured to generate, build, or otherwise provide a data packet for incorporation into the response 206 for before transmission of the response 206 to the client 165. The device 202 may be configured to provide the data packet to include within the response 206 from the server 195, the data file 208 generated by the data file management engine 218, and the script 210 generated, maintained, or otherwise provided by the script management engine 220. The device 202 may be configured to transmit the data packet to the client 165 which generated the request 204. In some embodiments, the device 202 may transmit the data file 208 and the script 210 in together with the response 206 from the backend server 195. In some embodiments, the device 202 may transmit the data file 208 and the script 210 separate from the response 206. The device 202 may be configured to transmit the data file 208 and script 210 via the connection 216 to the client 165 which generated the request 204. Once the client 165 receives the data file 208, script 210, and the response 206, the client 165 may be configured to execute the script 210 to generate one or more subsequent requests (which may include the data file 208 having the encrypted data from the device 202).

The device 202 may be configured to receive the subsequent request(s) from the client 165 (and including the data file 208). The device 202 may include a bot detection engine 222. The bot detection engine 222 may be or include any device, component, software, script, or other combination of hardware and software configured to determine whether a client 165 is associated with an autonomous program 212 (or bot). The bot detection engine 222 may be configured to parse, analyze, or inspect the subsequent request(s) to identify data for comparing to the encrypted data from the data file 208. The bot detection engine 222 may be configured to decrypt the encrypted data from the data file 208 (e.g., using a private key, a symmetric key, etc. from the data file management engine 218). The bot detection engine 222 may be configured to compare the encrypted data from the data file 208 with the data corresponding to the subsequent request to determine whether the client 165 is associated with a user or an autonomous program 212 (or bot). Various examples of encrypted data and of data from subsequent request(s) which may be used by the bot detection engine 222 to determine whether a client 165 is associated with a user or an autonomous program 212 are described with reference to FIG. 4 through FIG. 7.

Once the bot detection engine 222 determines whether the client 165 is associated with a user or an autonomous program 212, the bot detection engine 222 may be configured to generate a flag, identifier, string of bits or bytes, or other indicator which indicates that the client 165 is associated with a user (or an autonomous program 212). The bot detection engine 222 may include, maintain, store, or otherwise access a data structure including corresponding indicators which indicate whether a client 165 is associated with a user or an autonomous program. The data file management engine 218 may be configured to generate a cookie 208 for setting at the client 165 based on the indicator. For example, where the bot detection engine 222 determines that the client 165 is associated with a user, the data file management engine 218 may be configured to generate a data file 208 having the indicator which indicates that the client 165 is associated with a user. The device 202 may be configured to transmit the data file 208 to set at the client 165. When the client 165 generates one or more subsequent requests and transmits those requests to the device 202, the client 165 may include the data file 208 having the indicator with the requests. The device 202 may be configured to parse the data file 208 to extract an indicator indicating that the client 165 is associated with a user or an autonomous program. The indicator may include a flag, a string of bits or bytes, etc. The device 202 may use the indicator form the data file 208 to determine that the client 165 is associated with a user (e.g., by performing a comparison of the indicator from the data file 208 with an indicator stored in a data structure maintained or otherwise accessed by the device 202), and process the request accordingly. On the other hand, where the bot detection engine 222 determines that the client 165 is associated with an autonomous program 212, the cookie engine 218 may be configured to generate a data file 208 having the indicator which indicates that the client 165 is associated with an autonomous program 212. The device 202 may be configured to transmit the data file 208 to set at the client 165. When the client 165 generates one or more subsequent requests and transmits those requests to the device 202, the client 165 may include the data file 208 having the indicator with the requests. The device 202 may be configured to parse the data file 208, determine that the client 165 is associated with an autonomous program 212 (e.g., by performing a comparison of the indicator from the data file 208 with an indicator stored in a data structure maintained or otherwise accessed by the device 202), and block the requests.

Figure 3:
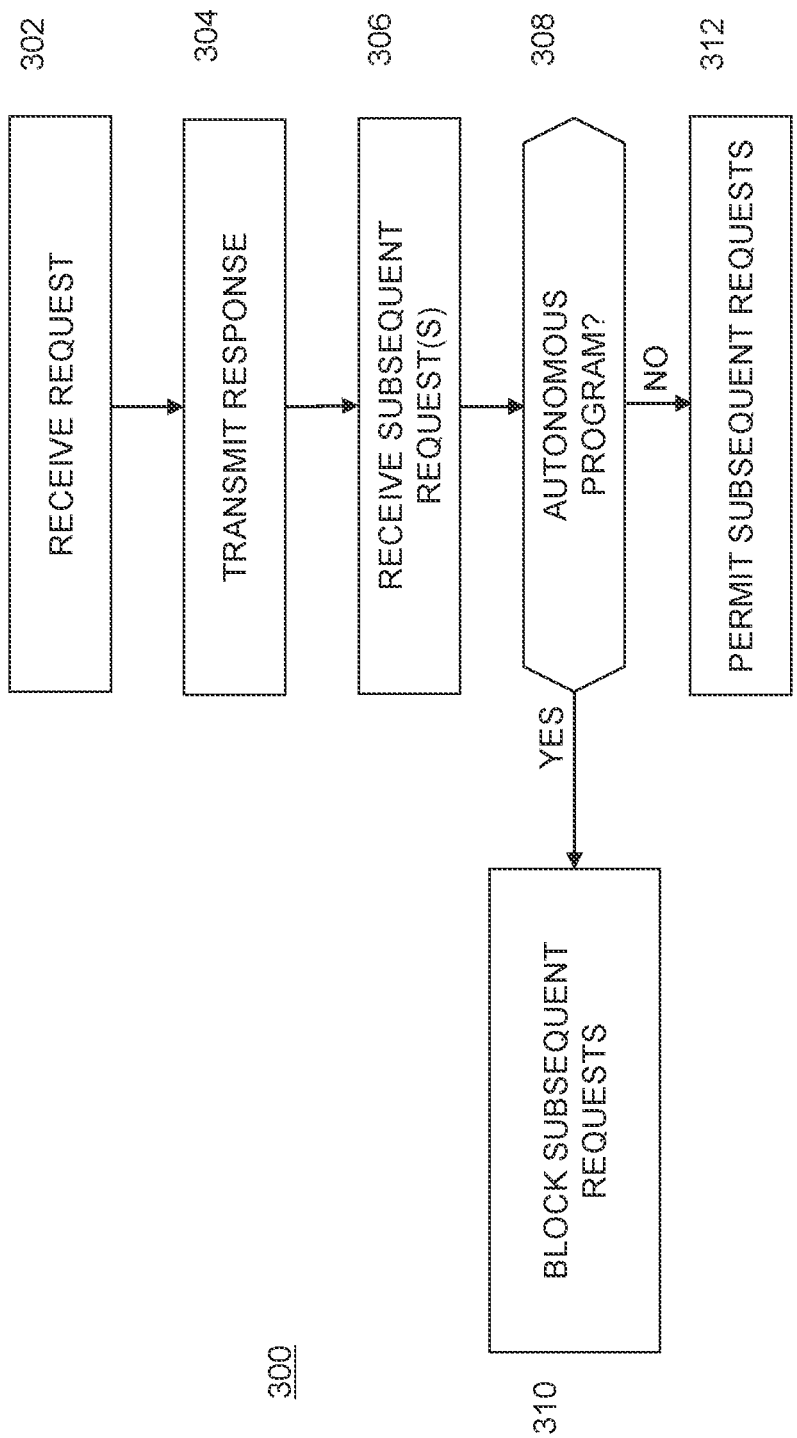
FIG. 3 is a flow diagram of a method for autonomous program detection, in accordance with an illustrative embodiment.

Referring now to FIG. 3, depicted is a flow diagram of one embodiment of a method 300 for autonomous program detection, according to an illustrative embodiment. Any of the operations described herein may be performed by one or more of the components or devices described above, for example, the device 202 or processor 105 (e.g., using instructions from memory 214). As a brief overview of the method 300, at step 302, the device 202 may receive a request (e.g., from a client 165). At step 304, the device 202 may transmit a response 206 to the request. At step 306, the device 202 may receive a second request 204. At step 308, the device 202 may determine whether the client is associated with an autonomous program 212. The device 202 may determine whether the client is associated with an autonomous program 212 using one or more of the methods described with reference to FIG. 4-FIG. 7. Where device 202 determines that the client 165 is associated with an autonomous program 212, the method 300 may proceed to step 310, where the device 202 blocks subsequent requests from the client 165. However, where the device 202 determines that the client 165 is associated with a user, the method 300 may proceed to step 312, where the device 202 permits subsequent requests.

At step 302, the device 202 may receive a request 204 (e.g., from a client 165). In some embodiments, the request 204 may be a request to post data to a server 195 or receive data from a server 195. For example, the request 204 may be or include an HTTP POST request or an HTTP GET request. The client 165 may be configured to generate an HTTP request and including an html index. The client 165 may establish a connection or session with the device 202 and transmit the HTTP request to the device 202. The client 165 may be configured to generate and transmit the HTTP request including an address (such as an IP address, a URL, or other address or identifier) corresponding to the server 195. The device 202 may transmit the request to a server 195 (e.g., a backend server). The server 195 may process the request and generate a corresponding response 206 for the client 165. The server 195 may transmit the response 206 to the device 202, which may then transmit the response 206 to the client 165, as described in greater detail below.

At step 304, the device 202 may transmit a response 206 to the request. In some embodiments, the device 202 may transmit the response 206 with a data file 208 and a script 210. In some embodiments, the device 202 may transmit one or more packets to the client 165. The packet(s) may include a response 206 to the request received at step 302, data encrypted by the device 202 for determining whether the client 165 is associated with a user or an autonomous program 212 (e.g., a data file 208), and data corresponding to a script 210 for executing on the client 165 to generate a second request from client 165 to the device 202. In some embodiments, the packet(s) may include data encrypted by the device 202. The data encrypted by the device 202 and included in the data file 208 may be or include a cookie for setting at the client 165. In some embodiments, the data encrypted by the device 202 may be data corresponding to an address from the request 204 (e.g., received at step 302), a timestamp corresponding to the response 206, data corresponding to a defined order of data received from the client 165 in the second request, a token corresponding to the client 165, etc.

The packet(s) may include data corresponding to a script 210 which executes on the client 165 to generate the second request to the device 202. In some embodiments, the script 210 may be a JavaScript snippet configured to automatically execute on the client 165 to generate the second request to the device 202. In some embodiments, the JavaScript snippet may cause the client 165 to generate a second request including a packet having a header corresponding to an address from the preceding request (e.g., the request received at the step 302). In some embodiments, the JavaScript snippet may cause the client 165 to generate a second request within a duration or period of time from the first request (e.g., the request received at the step 302). In some embodiments, the JavaScript snippet may cause the client 165 to generate a second request including a packet having data corresponding to the client 165 and/or a browser of the client 165. In some embodiments, the JavaScript snippet may cause the client 165 to generate a second request for a token from the device 202. Each of these examples are described in greater detail below with reference to FIG. 4-FIG. 7.

In some embodiments, the device may include, embed, or otherwise incorporate the encrypted data corresponding to the data file 208 and data corresponding to the script 210 (referred to generally as the data file 208 and the script 210) into the response received from the server.

At step 306, the device 202 may receive a second request 204 (from the client 165). The client 165 may generate the second request 204 responsive to the script 210 executing on the client 165. The second request 204 may include the data file 208 generated by the device 202 and included in the response 206 to the client 165 (e.g., at step 304). The second request may be or include a packet having a header including the address corresponding to the first request 204. The second request may be transmitted within a duration or period of time after the first request 204 is sent from the client 165 at step 302 (or after the client 165 receives the response 206 at step 304). The second request may include data corresponding to the client 165 and/or a browser of the client 165. In some embodiments, the device 202 may receive another request (e.g., a third request) subsequent to the first request (received at step 302) and prior to the second request (received at step 306). The third request may be a request for a token from the device 202. The device 202 may generate and transmit a token to the client 165, which may be included in the second request 204.

At step 308, the device 202 may determine whether the client is associated with an autonomous program 212. The device 202 may determine whether the client is associated with an autonomous program 212 using one or more of the methods described with reference to FIG. 4-FIG. 7. Where device 202 determines that the client 165 is associated with an autonomous program 212, the method 300 may proceed to step 310, where the device 202 blocks subsequent requests from the client 165. Where the device 202 determines that the client 165 is associated with a user, the method 300 may proceed to step 312, where the device 202 permits one or more subsequent requests.

At step 310, the device 202 may block subsequent requests from the client 165 to the server 195. In some embodiments, the device 202 may block subsequent requests by generating an indicator which indicates that the client 165 is associated with an autonomous program 212. The device 202 may generate a data file 208 which includes the indicator. The device 202 may transmit the data file 208 to the client 165 for setting at the client 165. When the client 165 generates subsequent requests, the client 165 may include the data file 208 with the subsequent requests. The device 202 may receive the subsequent requests from the client 165 including the data file 208. The device 202 may parse the data file 208 and determine that the data file 208 includes the indicator which indicates that the client 165 is associated with an autonomous program 212. The device 202 may be configured to parse the data file 208 to extract an indicator indicating that the client 165 is associated with an autonomous program. The indicator may include a flag, a string of bits or bytes, etc. The device 202 may use the indicator form the data file 208 to determine that the client 165 is associated with an autonomous program (e.g., by performing a comparison of the indicator from the data file 208 with an indicator stored in a data structure maintained or otherwise accessed by the device 202 which corresponds to autonomous programs). The device 202 may then block the subsequent request (e.g., based on the request including a data file 208 having an indicator which indicates that the client 165 is associated with an autonomous program 212). In some embodiments, the device 202 may block the subsequent request by returning a response to the client 165 indicating that the request has been blocked. In some embodiments, the device 202 may block the subsequent request by ignoring, deleting, or otherwise not generating and transmitting any responses to the client 165.

At step 312, the device 202 may permit subsequent requests from the client 165 to the server 195. In some embodiments, the device 202 may permit subsequent requests by generating an indicator which indicates that the client 165 is associated with a user. The device 202 may generate a data file 208 which includes the indicator. The device 202 may transmit the data file 208 to the client 165 for setting at the client 165. When the client 165 generates subsequent requests, the client 165 may include the data file 208 with the subsequent requests. The device 202 may receive the subsequent requests from the client 165 including the data file 208. The device 202 may parse the data file 208 and determine that the data file 208 includes the indicator which indicates that the client 165 is associated with a user. The device 202 may then permit the subsequent request (e.g., based on the request including a data file 208 having an indicator which indicates that the client 165 is associated with a user). In some embodiments, the device 202 may permit the subsequent request by transmitting, routing, or otherwise providing the request to the backend server 195 for generating a response. The backend server 195 may respond to the request with a response, which the device 202 may transmit, send, or otherwise provide to the client 165 (e.g., via the connection 216).

Figure 4:
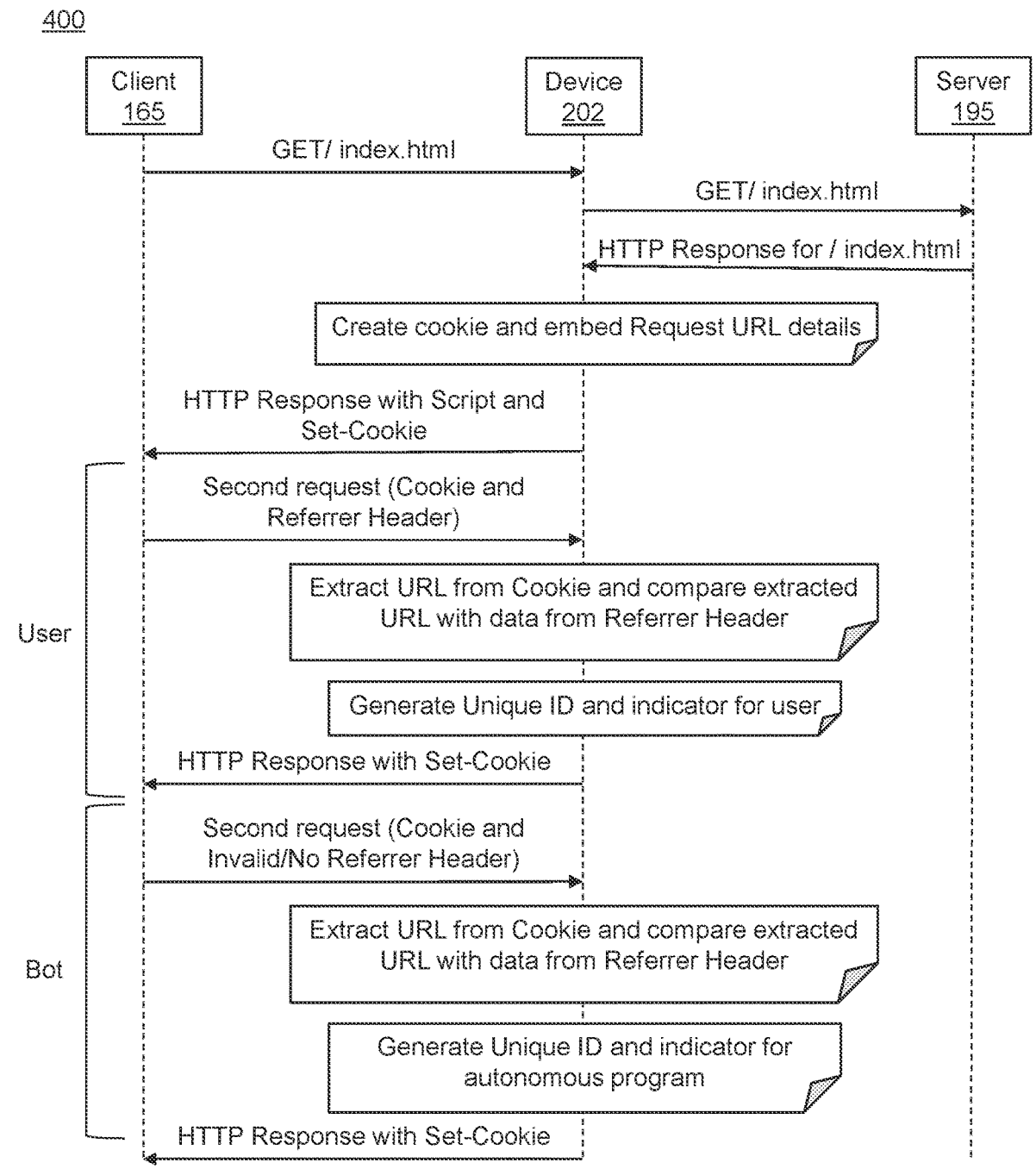
FIG. 4 is a flow diagram depicting is one possible implementation of a method of determining whether a client is associated with a user or an autonomous program, in accordance with an illustrative embodiment.

Referring now to FIG. 4, depicted is one possible implementation of a method 400 of determining whether a client 165 is associated with a user or an autonomous program 212, according to an illustrative embodiment. The method 400 may be performed or implemented by the device 202 or one or more components thereof, such as the data file management engine 218, the script management engine 220, the bot detection engine 222, and/or by the processor 105 using instructions stored on memory 214).

As shown in FIG. 4, the client 165 sends a request (such as an HTTP GET request) to the device 202 including an address, such as a URL address, page address, IP address, etc. ("index.html" in the example shown in FIG. 4) corresponding to the server 195 (e.g., a backend or origin server). The device 202 may transmit the request to the server 195 using the address from the request from the client 165. The server 195 may transmit a response to the device 202 for transmitting back to the client 165.

Once the device 202 receives the response from the server 195, the device 202 may generate a data file 208 for including with the response to the client 165. In some embodiments, the device 202 may generate a cookie (e.g., the data file 208 may include or correspond to a cookie) and include, embed, or otherwise incorporate URL details (such as the address) corresponding to the request from the client 165 into the cookie. The device 202 may encrypt the cookie using, for example, a key which is maintained by the device 202 and unavailable to the client 165. In some embodiments, the device 202 may encrypt the cookie using other encryption methods. In these and other embodiments, the device 202 may encrypt the cookie and provide the encrypted cookie to the client 165. The client 165, upon receiving the cookie, may not include a key or other decryption component or software to decrypt the cookie. As such, that the client 165 may not be capable of parsing the cookie to identify the URL details. The device 202 may transmit the response, the data file 208, and a script (e.g., a JavaScript snippet) for executing on the client to generate a second request. The device may transmit the response, the cookie, and a script to the client 165. In some embodiments, the data sent from the device 202 to the client 165 may include any of the response, the cookie, and the script. In some embodiments, the device 202 may transmit separate packets (e.g., packets of data) which include the response, the cookie, and the script. Once the client 165 receives the script, the script may automatically execute on a browser of the script to generate the second request. In the example shown in FIG. 4, the script may execute on the browser to generate a data packet including a header having an address (or other URL details) corresponding to the first request (e.g., initially sent by the client 165 and received by the device 202). In some embodiments, the script may execute on the client 165 to generate a response (e.g., an HTTP REFERRER post, which includes an address corresponding to the preceding request).

The device 202 may receive the second request from the client 165. The second request may include the referrer header from the client 165 and the cookie generated by the device 202 (which includes the address or other URL details corresponding to the first request). The device 202 may extract, from the cookie, the address or other URL details, and compare the URL details to those received from the client 165 in the referrer header. Where the URL details from the cookie and the referrer header match (e.g., the address from the cookie matches the address from the header of the packet of the second request), the device 202 may determine that the client 165 is associated with a user. On the other hand, where the URL details from the cookie and the URL details from the referrer header do not match (or where the second request does not include any URL details), the device 202 may determine that the client 165 is associated with an autonomous program 212 (or a bot).

When the device 202 determines that the client 165 is associated with a user, the device 202 may generate a unique identifier for the user (or the client 165) and an indicator which indicates that the client 165 is associated with a user. In some embodiments, the unique identifier may include an IP address for the client 165, a user name for the user, a unique string of bits or bytes which are generated for the client 165 based on the IP address, etc. The indicator may be or include a flag, string of bits or bytes, etc. which generally indicates that the cookie is from a client 165 which has been determined to be associated with a user (as opposed to an autonomous program or bot). The device 202 may include, incorporate, or otherwise provide the unique identifier and indicator in a cookie (similar to data file 208). The device 202 may transmit the cookie to the client 165 with a set-cookie function, to cause the client 165 to set the cookie for the client 165 (or a browser of the client 165). When the client 165 generates subsequent requests, the subsequent requests may include the cookie for the client 165. The device 202 may receive the subsequent requests (with the cookie), parse the cookie and determine that the client 165 is associated with a user. The device 202 may parse the cookie to extract the unique identifier and the indicator. In some embodiments, the device 202 may validate the unique identifier by comparing the unique identifier with data corresponding to the client 165 which transmitted the subsequent request (e.g., by comparing the IP address, a string which corresponds to the IP address, etc. from the cookie with an IP address of the client 165). Once the client 165 is validated as corresponding to the cookie, the device 202 may determine that the indicator from the cookie indicates that the validated client 165 has been determined to be associated with a user. The device 202 may then permit the requests (e.g., by transmitting the requests to a corresponding address for the server 195 or a different server 195, and transmitting responses from the server 195 to the client 165).

When the device 202 determines that the client 165 is associated with an autonomous program 212, the device 202 may generate a unique identifier for the client 165 and an indicator which indicates that the client 165 is associated with an autonomous program 212. Similar to the unique identifier for the client 165 generated above, the unique identifier may be an IP address corresponding to the client 165 which is associated with an autonomous program 212 (or a string of bits or bytes which corresponds to the IP address of the client 165). Similarly, the indicator may be or include a flag, string of bits or bytes, etc. which generally indicates that the cookie is from a client 165 which has been determined to be associated with an autonomous program or bot. The device 202 may include, incorporate, or otherwise provide the unique identifier and indicator in a cookie (similar to cookie 208). The device 202 may transmit the cookie to the client 165 with a set-cookie function, to cause the client 165 to set the cookie for the client 165 (or a browser of the client 165). When the client 165 generates subsequent requests, the subsequent requests may include the cookie for the client 165. The device 202 may receive the subsequent requests (with the cookie), parse the cookie and determine that the client 165 is associated with an autonomous program 212 (e.g., by extracting the unique identifier, validating the client 165 as being associated with the cookie, and determining that the indicator indicates the client 165 has previously been determined to be associated with an autonomous program as described above). The device 202 may then block or otherwise deny the requests (e.g., by deleting or ignoring the requests, responding to the requests with a response indicating that the request has been blocked, etc.).

Figure 5:
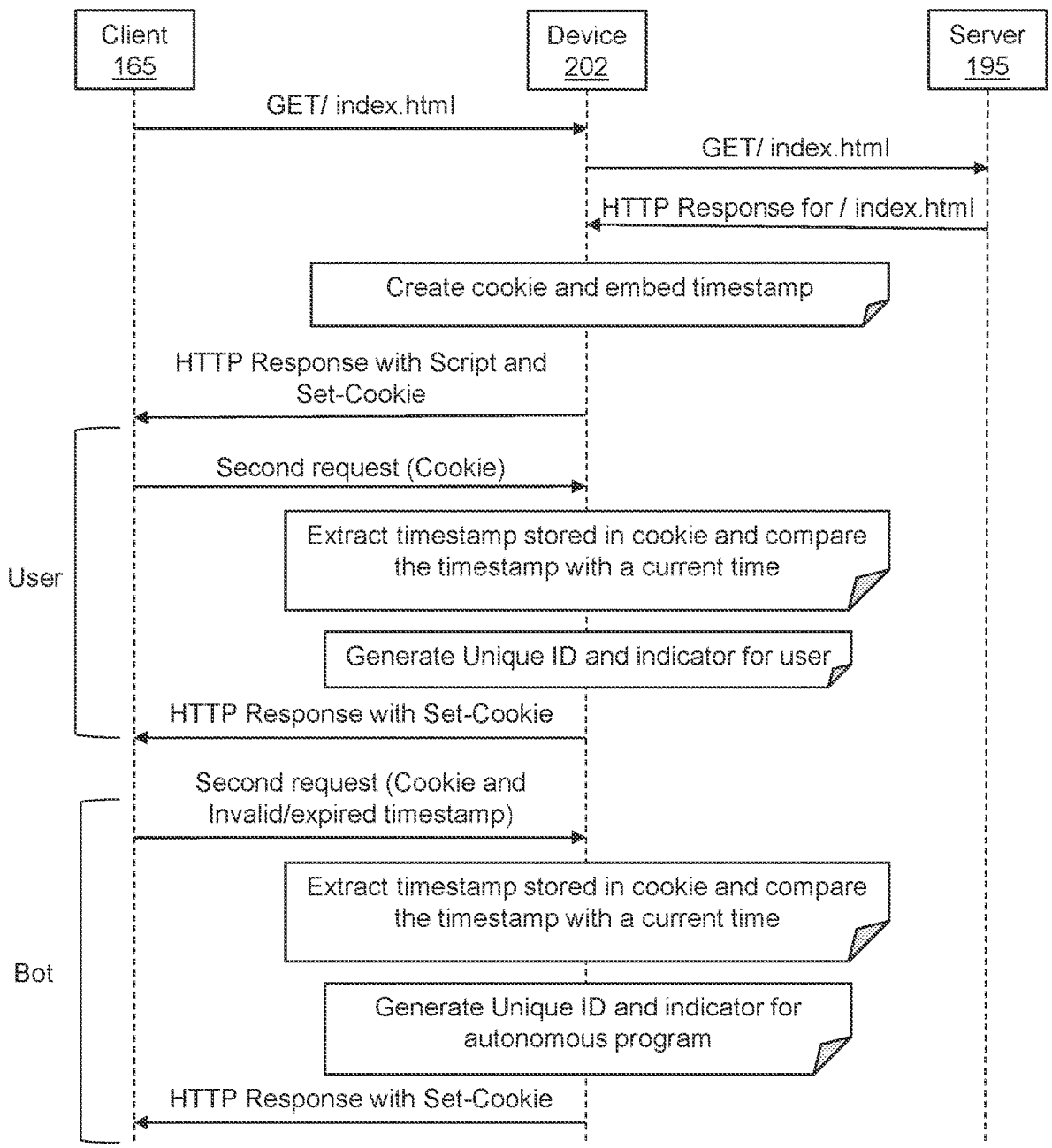
FIG. 5 is a flow diagram depicting is another possible implementation of a method of determining whether a client is associated with a user or an autonomous program, in accordance with an illustrative embodiment.

Referring now to FIG. 5, depicted is another possible implementation of a method 500 of determining whether a client 165 is associated with a user or an autonomous program 212, according to an illustrative embodiment. Similar to the method 400 shown in FIG. 4 and described above, the method 500 may be performed or implemented by the device 202 or one or more components thereof, such as the data file management engine 218, the script management engine 220, the bot detection engine 222, and/or by the processor 105 using instructions stored on memory 214.

As shown in FIG. 5, the client 165 sends a request (such as an HTTP GET request) to the device 202 including an index for transmitting to the server 195 (e.g., a backend or origin server). The device 202 may transmit the request (including the index from the request) to the server 195 according to the request from the client 165. The server 195 may transmit a response to the device 202 for transmitting back to the client 165.

Once the device 202 receives the response from the server 195, the device 202 may generate the data file 208 for including with the response to the client 165. In some embodiments, the device 202 may generate a cookie (such as data file 208) and include, embed, or otherwise incorporate a timestamp or other indicator of origin of the request and/or a response to the request into the cookie. In some embodiments, the timestamp may be a timestamp of the request (received by the device 202 from the client 165). In some embodiments, the timestamp may be a timestamp of the response (e.g., received by the device 202 from the server 195). In some embodiments, the timestamp may be a current time (e.g., a time at which the device 202 is generating the data packet). The device 202 may encrypt the cookie (e.g., using a public/private key, symmetric key, etc. maintained or otherwise accessible to the device 202 but not accessible to the client 165) prior to sending the cookie to the client 165 such that the client 165 is incapable of parsing the cookie 208 to identify the timestamp. The device 202 may generate data (e.g., one or more packets of data) which include the response, the cookie and a script (e.g., a JavaScript snippet) to the client 165 for executing on the client to generate (e.g., automatically generate) a second request. The device may transmit the data including the response, the cookie, and a script to the client 165.

Once the client 165 receives the data, the script may execute on a browser of the script to generate the second request. In the example shown in FIG. 5, the script may automatically execute on the browser to generate a second request. In some embodiments, the script may automatically execute on the client 165 to generate an HTTP POST request which includes various data corresponding to the client 165 and/or a browser of the client 165 (such as the data described with reference to FIG. 6). In some embodiments, the script may execute on the client 165 to generate an acknowledgement (e.g., the second request) of the response. The script may execute on the client 165 to generate the second request within a duration or timeframe (e.g., a predetermined time period) from the response.

The device 202 may receive the second request from the client 165. The second request may include the cookie generated by the device 202 (which includes the timestamp). Upon receiving the cookie in the second request, the device 202 may parse the cookie by decrypting the cookie using, for example, a key maintained by or otherwise accessible to the device 202 (e.g., which corresponds to the key which was used to encrypt the cookie). The device 202 may extract, from the decrypted cookie, the timestamp, and compare the timestamp to a time corresponding to the second request. For example, the device 202 may compare the timestamp from the cookie with a timestamp of the second request. As another example, the device 202 may compare the timestamp from the cookie with a current time (e.g., a time in which the device 202 receives the second request). The device 202 may compute a difference in time between the timestamp and the time corresponding to the second request. The device 202 may compare the difference in time to a threshold (such as, for example, two seconds, three seconds, four seconds, five seconds, etc.). Where the difference exceeds the threshold, the device 202 may determine that the client 165 is associated with an autonomous program 212 (or a bot). On the other hand, where the difference satisfies (e.g., is less than or is equal to) the threshold, the device 202 may determine that the client 165 is associated with a user.

Similar to the method 400 described above, when the device 202 determines that the client 165 is associated with a user, the device 202 may generate a unique identifier for the user (or the client 165) and an indicator which indicates that the client 165 is associated with a user. On the other hand, where the device 202 determines that the client 165 is associated with an autonomous program 212, the device 202 may generate a unique identifier for the client 165 and an indicator which indicates that the client 165 is associated with an autonomous program 212. The device 202 may provide the unique identifier and indicator (indicating that the client 165 is associated with a user or an autonomous program) in a cookie, and transmit the cookie to the client 165 with a set-cookie function, to cause the client 165 to set the cookie for the client 165 (or a browser of the client 165). When the client 165 generates subsequent requests, the subsequent requests may include the cookie for the client 165. The device 202 may receive the subsequent requests (with the cookie), parse the cookie and determine whether the client 165 is associated with a user or an autonomous program 212. The device 202 may then selectively permit or block subsequent requests from the client 165 based on the cookie included in those requests.

Referring now to FIG. 6, depicted is another possible implementation of a method 600 of determining whether a client 165 is associated with a user or an autonomous program 212, according to an illustrative embodiment. Similar to the methods 400, 500 shown in FIG. 4 and FIG. 5 and described above, the method 600 may be performed or implemented by the device 202 or one or more components thereof, such as the data file management engine 218, the script management engine 220, the bot detection engine 222, and/or by the processor 105 using instructions stored on memory 214).

As shown in FIG. 6, the client 165 sends a request (such as an HTTP GET request) to the device 202 including an index for transmitting to the server 195 (e.g., a backend or origin server). The device 202 may transmit the request (including the index from the request) to the server 195 according to the request from the client 165. The server 195 may transmit a response to the device 202 for transmitting back to the client 165.

Once the device 202 receives the response from the server 195, the device 202 may generate a data file 208 for including with the response to the client 165 along with a script (such as script 210). In some embodiments, the data file 208 may be a cookie. In the example shown in FIG. 6, the script 210 may execute on the client 165 to transmit, send, or otherwise provide one or more parameters (or attributes) of the client 165 to the device 202. In some embodiments, the script 210 may be a JavaScript snippet configured to execute on the client 165 and collect parameter(s) of the client 165 and/or browser. In some embodiments, the script 210 may collect and transmit the parameter(s) to the device 202 responsive to the client 165 receiving the script 210 from the device 202. In other words, the script 210 may be a self-executing script which runs on the client 165 and collects one or more parameters corresponding to the client 165 and/or browser. Various examples of parameters may include, for instance, parameters corresponding to the browser such as a user-agent, browser name (e.g., Internet Explorer, GOOGLE Chrome, FIREFOX, SAFARI, OPERA, etc.), a browser version, a browser major version etc., parameters corresponding to the device, such as operating system (e.g., WINDOWS, MAC, LINUX, UBUNTU, SOLARIS), a device model, a device vendor, a device type, a central processing unit (CPU) architecture, whether the device is a mobile device and parameters corresponding thereto (e.g., mobile version, mobile OS [such as ANDROID, OPERA mini, IEMobile, BLACKBERRY, IPHONE, IPAD, IPOD]), screen parameters (e.g., current screen resolution, available screen resolution, color depth, device XDPI, device YDPI), whether the device has any plugins enabled and corresponding versions (e.g., JAVA, Flash, SILVERLIGHT, etc.), mime types, fonts (such as current or available fonts), local storage availability, whether cookies are enabled, a current time zone, a language, a system language, a canvas, etc. The script 210 may be configured to transmit (e.g., automatically transmit) the one or more parameters (e.g., in a POST body).

In the example shown in FIG. 6, the device 202 may define an order of the parameters which are to be sent from the client 165 to the device 202. For example, the device 202 may generate a random order in which the client 165 is to send parameters to the device 202, which may be different from an order in which another client 165 is to send parameters to the device 202. The device 202 may configure the script 210 to cause the client 165 to send the parameters to the device 202 in the defined order (as set by the device 202). Additionally, the device 202 may include, incorporate, or otherwise provide the order of parameters in the cookie which is to be sent with the response and the script 210 (e.g., in the data packet including the response from the server 195). The device 202 may encrypt the cookie such that the client 165 is incapable of parsing the cookie 208 to identify the defined order of parameters. The device 202 may generate the data packet to include the response, the cookie, and a script (e.g., a JavaScript snippet) for executing on the client to automatically generate a second request (e.g., including the parameters in the defined order). The device may transmit the data packet including the response, the cookie, and a script to the client 165.

Once the client 165 receives the data (e.g., the response, the data file 208, and the script 210) from the device 202, the script may execute on a browser of the script to generate the second request including the parameters. The script may automatically execute on the client 165 to collect parameters defined in the script, and generate the second request to include the collected parameters in the defined order. The script may include the collected parameters in the defined order in a POST body of the second request. The script may execute on the client 165 to transmit the second request (e.g., including the parameters in the defined order and the cookie) to the device 202.

The device 202 may receive the second request from the client 165. The second request may include the cookie generated by the device 202 (which includes the defined order) and each of the parameters. The device 202 may extract, from the cookie, the defined order, and compare the defined order to an order of the parameters included in the second request. Where the second request includes parameters which are in the defined order (e.g., the order of parameters from the second request matches the order of parameters from the cookie), the device 202 may determine that the client 165 is associated with a user. However, where the second request includes parameters which are not in the defined order (or the second request includes different, additional, or fewer parameters), the device 202 may determine that the client 165 is associated with an autonomous program 212.

Similar to the methods 400, 500 described above, when the device 202 determines that the client 165 is associated with a user, the device 202 may generate a unique identifier for the user (or the client 165) and an indicator which indicates that the client 165 is associated with a user. On the other hand, where the device 202 determines that the client 165 is associated with an autonomous program 212, the device 202 may generate a unique identifier for the client 165 and an indicator which indicates that the client 165 is associated with an autonomous program 212. The device 202 may provide the unique identifier and indicator (indicating that the client 165 is associated with a user or an autonomous program) in a cookie, and transmit the cookie to the client 165 with a set-cookie function, to cause the client 165 to set the cookie for the client 165 (or a browser of the client 165). When the client 165 generates subsequent requests, the subsequent requests may include the cookie for the client 165. The device 202 may receive the subsequent requests (with the cookie), parse the cookie and determine whether the client 165 is associated with a user or an autonomous program 212. The device 202 may then selectively permit or block subsequent requests from the client 165 based on the cookie included in those requests.

Referring now to FIG. 7, depicted is another possible implementation of a method 700 of determining whether a client 165 is associated with a user or an autonomous program 212, according to an illustrative embodiment. Similar to the methods 400, 500, 600 shown in FIG. 4-FIG. 6 and described above, the method 700 may be performed or implemented by the device 202 or one or more components thereof, such as the data file management engine 218, the script management engine 220, the bot detection engine 222, and/or by the processor 105 using instructions stored on memory 214).

As shown in FIG. 7, the client 165 sends a request (such as an HTTP GET request) to the device 202, including an index for transmitting to the server 195 (e.g., a backend or origin server). The device 202 may transmit the request (including the index from the request) to the server 195 according to the request from the client 165. The server 195 may transmit a response to the device 202 for transmitting back to the client 165.

Once the device 202 receives the response from the server 195, the device 202 may generate a data file 208 a data packet for including with the response to the client 165. In some embodiments, the device 202 may generate a token for the client 165. The token may be a unique string, identifier, or other data element which is unique to the client 165. The device 202 may include, embed, incorporate, or otherwise provide the token in the data file 208 which is sent to the client 165. In some embodiments, the data file 208 may be a cookie which is sent to the client. The device 202 may encrypt the data file 208 (e.g., using a public/private key, symmetric key, etc. maintained or otherwise accessible to the device 202 but not accessible to the client 165) prior to sending the cookie to the client 165 such that the client 165 is incapable of parsing the cookie 208 to identify the token. The device 202 may generate data to include the response, the cookie, and a script (e.g., a JavaScript snippet) for executing on the client to generate one or more additional requests. The device may transmit the data including the response, the cookie, and a script to the client 165.

Once the client 165 receives the data packet, the script may execute on a browser of the script to generate a request for a token (e.g., an HTTP GET request for a token). The client 165 may transmit the request for a token to the device 202 including the cookie received from the device 202. Once the device 202 receives the request for the token (including the cookie), the device 202 may extract the token from the cookie (e.g., by decrypting the cookie and identifying data corresponding to the token incorporated, included, or otherwise provided in the cookie) and transmit, send, or otherwise provide the extracted token to the client 165. Following the client 165 receiving the token from the device 202, the client 165 may provide the token with another request for the server 195 or for the device 202 (e.g., a POST request, a GET request, etc.), which may also include the cookie.

The device 202 may receive the request from the client 165 for the server 195 or device 202 having the token and the cookie. The device 202 may decrypt the cookie using a key maintained or otherwise accessible by the device 202 and extract, from the decrypted cookie, the token. The device 202 may compare the token from the cookie with the token received from the client 165. Where the token from the cookie matches the token received from the client 165, the device 202 may determine that the client 165 is associated with a user. However, where the token from the cookie does not match the token received from the client 165 (or the token received from the client 165 is an invalid or expired token), the device 202 may determine that the client 165 is associated with an autonomous program 212.

Similar to the methods 400-600 described above, when the device 202 determines that the client 165 is associated with a user, the device 202 may generate a unique identifier for the user (or the client 165) and an indicator which indicates that the client 165 is associated with a user. On the other hand, where the device 202 determines that the client 165 is associated with an autonomous program 212, the device 202 may generate a unique identifier for the client 165 and an indicator which indicates that the client 165 is associated with an autonomous program 212. The device 202 may provide the unique identifier and indicator (indicating that the client 165 is associated with a user or an autonomous program) in a cookie, and transmit the cookie to the client 165 with a set-cookie function, to cause the client 165 to set the cookie for the client 165 (or a browser of the client 165). When the client 165 generates subsequent requests, the subsequent requests may include the cookie for the client 165. The device 202 may receive the subsequent requests (with the cookie), parse the cookie and determine whether the client 165 is associated with a user or an autonomous program 212. The device 202 may then selectively permit or block subsequent requests from the client 165 based on the cookie included in those requests.

Various elements, which are described herein in the context of one or more embodiments, may be provided separately or in any suitable sub-combination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

We claim:

1. A method comprising:
transmitting, by a device intermediary to a client and a server, data to the client in response to a first request from the client, the data including a response to the first request and a copy of data available to the device corresponding to the first request or the client;
receiving, by the device, from the client, a second request including the copy of data; and
determining, by the device, that the second request is from an autonomous program rather than a user of the client based on the copy of data from the second request; and
blocking, by the device, at least one subsequent request from the client in response to the determination that the second request is from an autonomous program.

2. The method of claim 1, wherein the copy of data comprises one of an address corresponding to the first request, a timestamp corresponding to the response, a defined order of data received in the second request, or a token.

3. The method of claim 1, wherein determining that the second request is from an autonomous program is based on a comparison of data corresponding to the second request and the copy of data.

4. The method of claim 1, wherein the copy of data comprises an address corresponding to the first request, and wherein the second request comprises a packet including a packet header having an address corresponding to a preceding request, and wherein determining that second request is from an autonomous program is based on a comparison of the address included in the packet header of the second request with the address from the encrypted data.

5. The method of claim 1, wherein the copy of data comprises a timestamp corresponding to the response from the device to the client, the method further comprising:

determining a difference between a time corresponding to the second request and the timestamp from the copy of data; and comparing the difference to a predetermined threshold, wherein determining that the second request is from an autonomous program is based on the comparison.

6. The method of claim 1, wherein the second request includes a plurality of parameters corresponding to the client, and wherein the copy of data comprises data corresponding to a defined order of the plurality of parameters, and wherein determining whether the second request is from an autonomous program is based on a comparison of an order of parameters received in the second request to the defined order of the plurality of parameters from the copy of data.

7. The method of claim 1, wherein the copy of data comprises a first token generated for the client.

8. The method of claim 7, further comprising:

receiving, by the device, from the client, a third request for a token subsequent to the first request and prior to the second request, wherein the third request comprises the copy of data;

extracting, by the device, the first token from the copy of data; and transmitting, by the device, the first token to the client, wherein the second request includes a second token, wherein determining that the second request is from an autonomous program is based on a comparison of the second token from the second request and the first token of the copy of data.

9. The method of claim 1, further comprising:

generating, by the device, responsive to determining that the second request is from an autonomous program, a cookie having an indicator which indicates that the client is associated with an autonomous program; and transmitting, by the device to the client, the cookie, to set the cookie on the client, wherein the at least one subsequent request from the client include the cookie having the indicator.

10. The method of claim 1, further comprising:

generating, by the device, responsive to determining that the second request is associated with a user of the client, a cookie having an indicator which indicates that the client is associated with user; and transmitting, by the device to the client, the cookie, to set the cookie on the client, wherein the at least one subsequent request from the client include the cookie having the indicator.

11. A system comprising:

a device arranged intermediate a client and a server, the device configured to:

transmit data to the client in response to a first request from the client, the data including a response to the first request and a copy of data available to the device corresponding to the first request or the client;

receive, from the client, the second request including the copy of data;

determine, based on the copy of data, that the second request is from an autonomous program rather than a user of the client; and block at least one subsequent request from the client in response to the determination that the second request is from an autonomous program.

12. The system of claim 11, wherein the copy of data comprises one of an address corresponding to the first request, a timestamp corresponding to the response, a defined order of data received in the second request, or a token.

13. The system of claim 11, wherein determining that the second request is from an autonomous program is based on a comparison of data corresponding to the second request and the copy of data.

14. The system of claim 11, wherein the copy of data comprises an address corresponding to the first request, and wherein the second request includes a packet header having an address corresponding to a preceding request, and wherein determining that the second request is from an autonomous program is based on a comparison of the address included in the packet header of the second request with the address from the encrypted data.

15. The system of claim 11, wherein the copy of data comprises a timestamp corresponding to the response from the device to the client, and wherein the device is further configured to:

determine a difference between a time corresponding to the second request and the timestamp from the copy of data; and compare the difference to a predetermined threshold, wherein determining that the second request is from an autonomous program is based on the comparison.

16. The system of claim 11, wherein the second request includes a plurality of parameters to the device, and wherein the copy of data comprises data corresponding to a defined order of the plurality of parameters, and wherein determining that the second request is from an autonomous program is based on a comparison of an order of parameters received in the second request to the defined order of the plurality of parameters from the encrypted data.

17. The system of claim 11, wherein the copy of data comprises a first token generated for the client.

18. The system of claim 17, wherein the device is further configured to:

receive, from the client, a third request for a token subsequent to the first request and prior to the second request, wherein the third request comprises the copy of data;

extract the first token from the copy of data; and transmit the first token to the client, wherein the second request includes a second token, wherein determining that the second request is from an autonomous program is based on a comparison of the second token from the second request and the first token of the encrypted data.

19. The system of claim 11, wherein the device is further configured to:

generate, responsive to determining that the second request is from an autonomous program, a cookie having an indicator which indicates that the client is associated with an autonomous program; and transmit, to the client, the cookie, to set the cookie on the client, wherein the at least one subsequent request from the client include the cookie having the indicator.

20. A non-transitory computer readable medium storing program instructions for causing a device including one or more processors to:

receive, from a client, a first request for a server;

transmit one or more data packets to the client, the one or more data packets including a response to the request from the server, a script executable on the client to generate a second request, and data encrypted by the device and configurable to identify an autonomous program;

receive, from the client, the second request including the encrypted data;
determine, based on data of the second request, that the client is associated with a user or an autonomous program; and
block, responsive to the determination that the client is associated with an autonomous program, one or more subsequent requests from the client to the server.

\* \* \* \* \*